United States Patent [19]

Stock et al.

[11] Patent Number: 5,104,983

[45] Date of Patent: Apr. 14, 1992

[54] DYEABLE BMC MOLDING COMPOUNDS

[75] Inventors: Claude Stock, Keskastel; Toni Seethaler, Birkenau; Norbert Blümler, Hemsbach, all of Fed. Rep. of Germany

[73] Assignee: Firma Carl Freudenberg, Weinheim/Bergstr., Fed. Rep. of Germany

[21] Appl. No.: 568,356

[22] Filed: Aug. 15, 1990

[30] Foreign Application Priority Data

Aug. 17, 1989 [DE] Fed. Rep. of Germany ....... 3927090

[51] Int. Cl.$^5$ .......................... C08J 5/10; C08K 5/52; C08L 23/32
[52] U.S. Cl. .................................. 524/141; 524/143; 524/145; 524/513; 523/506; 523/526
[58] Field of Search ............... 524/141, 143, 145, 513; 523/506, 526

[56] References Cited

U.S. PATENT DOCUMENTS 4,555,534 11/1985 Atkins .................................. 523/511

Primary Examiner—Paul R. Michl
Assistant Examiner—U. K. Rajguru
Attorney, Agent, or Firm—Kenyon & Kenyon

[57] ABSTRACT

This invention is directed to a low shrink BMC molding compound that is uniformly dyeable in virtually any color which includes a contraction-compensating additive, such as polystyrene or polyethlene, about 0.3 to 5 parts by weight of a surface active agent of the formula:

$$R-(-X-)_n-OPO_3H_2;$$

wherein X = ethylene oxide or propylene oxide; n = 0, 1, 2, 3, ..., 40; R = aromatic or aliphatic residue with a carbon number of 5 to 40; and about 250 to 300 parts by weight of mineral filler.

21 Claims, No Drawings

DYEABLE BMC MOLDING COMPOUNDS

FIELD OF THE INVENTION

The invention relates to a formulation for dyeable BMC molding compounds useful in melting core technology. BMC is a common acronym for Bulk Molding Compositions which can be generally described an fiberglass-reinforced, thermoplastic resins such as, unsaturated polyesters (UP-) or vinyl ester 3.

BACKGROUND OF THE INVENTION

In the automotive industry, BMC molding compounds can be used to fabricate various parts, in particular, highly stressable cylinder-head covers and oil pan covers, rear flaps, vacuum manifolds and/or bumpers. BMC molding compounds are, of course, useful in other applications such as the manufacture of household appliances, toys, furniture, etc.

The physical and mechanical properties of BMC molding compounds can be adapted to specific applications by the selection of the resins, additives, setting agents, fillers and reinforcement fibers, used in their formulation. A detailed description of conventional formulation materials and their effects may be found in the Plastics Manual [Kunststoff-Handbuch], 2nd edition (1988), pp 288 to 291. This reference describes the current state of the art and the descriptions therein concerning SMC technology (manufacturing flat work pieces) also apply to BMC technology.

Thermosetting and thermoplastic plastics shrink (contract in volume) when they are solidified in closed molds, e.g., extrusion, injection molding tools. As a result when cooled, the dimensions of the resulting molded parts are smaller than the corresponding dimensions of the tool. To reduce this contraction effect, Low Shrink (LS-) and Low Profile (LP-) unsaturated polyester resins are employed to reduce shrinkage and obtain molded component surfaces which are qualitatively good. The LP- resins are used as additives to control shrinkage in reinforced unsaturated polyester molding compositions that are cured at temperatures above about 100° C. The LP- additives are typically dispersed or dissolved in a monomeric solvent, e.g., styrene, before being added to the unsaturated polyester compositions.

The contraction-compensating effect of LP-additives is believed to result from the fact that the thermoplastic separates out of the resinous system as a dispersed phase during the cross-linking process and consequently the monomeric styrene is occluded or dissolved in the unsaturated polyester resin. Initially the occluded styrene monomer does not take part in the copolymerization of the dispersed phase. The free styrene develops a vapor pressure corresponding to the curing temperature and the heat of reaction being liberated. This increases the volume of the cured dispersed phase thereby compensating for the contraction caused by cross-linking the unsaturated polyester resin. After the unsaturated polyester has formed a compacted (cured) outer phase the remaining styrene polymerizes. LP- additives are known to reduce shrinkage of conventional unsaturated polyester resins to between about minus 0.04% and plus 0.04% by volume. Notably, the contraction associated with unsaturated polyester resins can be overcompensated for with LP-additives and even produce expansion.

In comparison, LS-(Low Shrink) additives are known to reduce contraction to about minus 0.06%. Therefore, LS-additives are not well suited for melting core technologies where resins are shrunk onto a core so intensively that they often crack. For this reason, unsaturated polyester resins having LP- characteristics are preferred for use in melting core technology applications. A more detailed description of LS- and LP- resins can be found in the Plastics Manual supra the text of which is incorporated herein by reference.

Intense internal forces (stress and strain) in molded components can be caused by vibration, e.g., vibration produced by a chassis and/or motor, particularly in the case of diesel driven vehicles and equipment. These internal forces can develop in complicated molded components, such as vacuum manifolds and motors, casings and sheathings, leading to physical failures. The stress and strain inherent in such components can also lead to failure, e.g., crack formation and breaking, so that a small overload from external forces can be enough to produce destructive bending and/or shearing forces.

For the above reasons, unsaturated polyester resins having LP- characteristics have been used to manufacture Components for such applications. However, a significant disadvantage of these LP-modified unsaturated polyester resins is that they are not easily dyed uniformly due to a 'white effect' known to occur during hardening, i.e., striae and spots form on the surface of the cured component. In addition, not all coloring pigments, particularly the black or white dyes, can be used for dyeing in LP- unsaturated polyester resins, because clear, uniform color tones cannot be produced due to the two- phase system which occurs in these resins (Plastics Manual (1988) pp. 290).

Dying of BMC molding compounds has become increasingly important, particularly in the automotive industry, where the appearance of motor parts is a design requirement. For example, a deep black coloration for vacuum manifolds is often desired. Moreover, the production of heterochromatic engine components, such as couplings or casings, may be important in the future of the automotive industry. Heretofore, for the above mentioned reasons, the prior art has not provided the desired uniform dyeing of thermosetting polyester BMC molding compounds having LP-characteristics.

OBJECTS AND SUMMARY OF THE INVENTION

An object of the present invention is to provide BMC molding compounds, preferably thermosetting polyesters having LP- characteristics, that can be uniformly dyed to virtually any color.

It is also an object of the invention to provide dyeable BMC molding compounds that can be conveniently molded, to form molded components having complicated structures in melting core processes without cracking.

It is another object of the invention to provide BMC molding compounds having LP- characteristics that resist failure due to vibration and that are adapted to be used in or on movable and/or shaking parts, such as automobile engines.

Another object of the invention is to provide BMC molding compounds with a high filler content attainable solely by uniformly mixing a filler into a resin constituent without adding the filler portion just before molding to avoid mechanical inhomogeneities in the compound known to cause striae and spots in cured compound.

Another object of the invention is to provide a BMC molding compound incorporating LS- additives, such as polystyrene or polyethylene, that are uniformly dyeable and have LP- characteristics. Advantageously, the LP- additives known to impede uniform dying can be eliminated in many applications of this invention.

Another advantage is that molded components made with the BMC compounds of this invention have good mechanical properties, such as flexural-E-modulus, bending strength, edge fiber elongation, impact resistance and notch impact.

Another advantage of the BMC compounds of this invention is that they can be mixed with conventional molding compounds to provide a considerable reduction in shrinkage and in some cases a slight overcompensation (expansion). This effect makes it possible to employ LS- resins in melting core technology.

Another advantage is that the creep behavior under pressure of the finished components made in accordance with this invention is considerably improved, e.g., the flow caused by screw-on lugs in components molded with conventional BMC compounds due to high torque, is reduced.

Another advantage of the BMC compounds of the invention, is that material costs are lowered because inexpensive filler may be used in larger quantities and therefore less resin is required. In addition, the LS-additives are generally considerably cheaper than LP-additives.

The advantages realized with BMC compounds according to the invention also apply to SMC compounds, which are particularly suited to manufacturing flat molded articles.

The present invention provides a uniformly dyeable BMC molding compound comprising a curable base resin including a thermoplastic contraction-compensating additive and a surfactant having the general formula:

$$R-(-X-)_n-OPO_3H_2$$

wherein X is ethylene or propylene oxide; n is an integer between 0 and about 40; and R is an aliphatic or aromatic group including about 5 to about 40 carbon atoms.

The present invention also provides a dyeable thermosetting polyester BMC molding compound having LP-characteristics, comprising: about 100 parts by weight of a resinous constituent, composed of about 50 to about 100 parts by weight of a resin in a styrene monomer solvent selected from the group consisting of unsaturated polyester and vinyl ester further including up to about 50 parts by weight of a contraction-compensating thermoplastic in a styrene monomer solvent selected from the group consisting of polystyrene and polyethylene; up to about 3 parts by weight of a thickening agent; about 1 to about 6 parts by Weight of a mold release agent; about 1 to about 4 parts by weight of a polymerization initiator; up to about 4 parts by weight of a polymerization accelerator; about 0.5 to about 5 parts by weight of dye; about 50 to about 250 parts by weight of glass fibers having an average diameter of about 8 to about 30 micrometers and length of about 1 to about 30 mm; up to about 0.5 parts by weight of a polymerization inhibitor; and a surfactant in an amount of about 0.3 to about 5 parts by weight effective to reduce the viscosity of the resin constituent to a minimum; and having the formula (I)

$$R-(-X-)_n-OPO_3H_2$$

wherein X is ethylene oxide or propylene oxide; n is 0, 1, 2, 3, ....., 40; and R is an aromatic or aliphatic group having a carbon number of about 5 to about 40;and about 250 to about 350 parts by weight of a mineral filler having a particle size distribution of about 0.5 to about 100 micrometers which is uniformly in the resin constituent.

DETAILED DESCRIPTION OF THE INVENTION

The base resin constituent of the BMC molding compounds of this invention are resins, e.g., 100 parts by weight unsaturated polyester resin or vinyl ester resin, which may include up to about 50 parts by weight of a thermoplastic, contraction-compensating thermoplastic such as polystyrene or polyethylene. Exemplary unsaturated polyester resins are those derived from maleic acid, orthophthalic acid, isophthalic acid, terephthalic acid and bisphenol-A. The unsaturated polyester and contraction-compensating resins are commercially available in styrene monomer solvents.

Thickening agents may be employed in the BMC compounds of this invention to avoid separation of the liquid and solid constituents which often occurs at processing temperatures and pressures. Preferred thickening agents include the oxides or hydroxides of elements of the second main group or the auxiliary group of the periodic system (alkali and alkali earth metals) used in amounts up to about 3 parts by weight of the compound.

Mold release agents may be employed in the BMC compounds of this invention to ease removal of molded components from a mold. Preferred mold release agents include zinc stearate or calcium stearate, in quantities of about 1 to about 6 parts by weight of the compound.

Polymerization initiators may be used in the BMC compounds of this invention to start the polymerization reaction. Preferred organic initiators include organic peroxides, for example, alkyl salts of perbenzoic acid, in quantities of about 1 to about 4 parts by weight of the compound.

Accelerators may be used in the BMC compositions of this invention to speed the cure of cold-curing materials. Preferred polymerization accelerators include cobalt-octanoate (the cobalt salt of octanoic acid) in quantities of up to about 4 parts by weight of the compound.

Coloring pigments or dyes of any color may be employed in the BMC compounds of this invention, usually in quantities of about 0.5 to 5 parts by weight, depending on their covering power and desired color intensity. Useful dyes include organic and inorganic compounds. The dye, particularly organic dyes, must be selected to withstand the processing and application conditions of the molding compounds and/or finished molded components. Selection of an appropriate dye can be made in accordance with the teachings found in the Plastics Manual, 2nd edition (1988), pp 183 to 193 the text of which is hereinabove incorporated by reference.

Reinforcing glass fibers may be added to the BMC compounds of this invention to increase strength, usually in quantities of about 50 to 250 by weight of the compound, for example, up to about 60 parts by weight glass fiber is useful in the manufacture of bumpers. The fiber diameter is preferably in the range of about 8 to about 30 micrometers and, their length is preferably about 1 to 30 about mm.

Polymerization inhibitors may be employed in the BMC compounds of this invention to improve storage stability and/or control the course of the polymerization reaction; the flow time of a compound in a tool is also influenced by this such agents. Preferred polymerization retarding agents include p-benzoquinone in quantities of up to about 0.5 parts by weight of the compound.

Mineral fillers including, for example, calcium carbonate, aluminum trihydrate, dolomite, barium and kaolin having a particle-size distribution of about 0.5 micrometers to about 100 micrometers and surface active agents (surfactants) are also useful in the compounds of this invention.

The BMC molding compounds formulated in accordance with this invention include a surfactant having the formula (I) R—(—X—)$_n$—OPO$_3$H$_2$ wherein X is ethylene oxide or propylene oxide; n is a Whole number from 0 to about 40; R is an aromatic or aliphatic group having about 5 to about 40 carbon atoms. The surfactant enhances contact between the resin and the filler. When preparing the BMC molding compounds of this invention is advantageous to add sufficient surfactant, preferably before adding the glass fibers, to reduce the viscosity of the resin constituent to a minimum so that the amount of the fillers that can be uniformly admixed is increased, e.g., up to about 20% increase by weight or volume. The high filler content is believed to help compensate or overcompensate shrinkage of the resin constituent because the molecular structural elements must cross-link around the fillers and the developing expansion of the polymer lattice is frozen, so to speak, in the finished component after molding is completed.

The following Examples illustrate specific embodiments of the invention which are not intended to be limiting.

COMPARATIVE EXAMPLE
(LOW-PROFILE POLYESTER-BMC; PRIOR ART)

TABLE 1

| Parts by weight | Constituents | Specifications |
|---|---|---|
| 70 | UP- resin of orthophthalic acid and 1,3- propanediol, in styrene monomer | Styrene mass part: 35% (DIN 16 945, 4.14); viscosity: 1350 mPa.s (DIN 53 214) |
| 30 | LP- additive of polyvinyl acetate, in styrene monomer | Styrene mass part: 60% (DIN 16 945, 4.14); viscosity: 2000 mPa.s (DIN 53 214) |
| 200 | Filler: calcium carbonate | Average particle diameter: 8 um; BET surface: 1.5 m$^2$/g |
| 1.5 | Thickening reagent: 35% MgO in monomer-free UP resin | Viscosity (25° C.): 12000 to 18000 mPa.s |
| 4 | Internal release agent: zinc stearate | Powder |
| 2 | Polymerization inhibitor: Tert.-butyl-perbenzoate | Liquid |
| 2 | Pigment paste "black" with binding agent of diallyl phthalate and styrene-containing UP resin | Viscosity: 6000 mPa.s (DIN 53 214) |

TABLE 1-continued

| Parts by weight | Constituents | Specifications |
|---|---|---|
| 60 | Glass fibers | d: 10 μm; length: 6 mm |

A vacuum manifold for an automotive engine was manufactured from the mixture of Table 1 by a melting core process. Due to the small filler content the material exhibited substantial creep when it was mechanically stressed at higher temperatures which required that the fasteners (bolts) be provided with inserts (washers). Due to the creep, the bolt connections are subject to becoming loose under the influence of vibration, particularly the shaking caused by diesel engines.

The calcium carbonate filler has hydrophilic surfaces while the unsaturated polyester surfaces are hydrophobic and these incompatibilities are apparent in the styrene monomer solvent leading to formation of unwanted agglomerates that cause mechanical defects appear on the molded components under stress.

In the presence of an LP- additive, this compound is not uniformly dyeable; the suction manifold manufactured from it gave the impression of being made of faulty material and not "of one casting", i.e., its surface had a dirty-grey, marble-type appearance and showed striae.

EXAMPLE 1
(BLACK, DYED POLYESTER BMC COMPOUND)

TABLE 2

| Parts by weight | Constituents | Specifications |
|---|---|---|
| 70 | UP- resin of maleic acid and 1,3- propanediol, in styrene monomer | Styrene mass part: 33% (DIN 16 945, 4.14); viscosity: 1100 mPa · s (DIN 53 214) |
| 30 | LS- additive of polystyrene, in styrene monomer | Styrene mass part: 67% (DIN 16 945, 4.14); viscosity: 6500 mPa · s (DIN 53 214) |
| 3 | Surface-reactive reagent: 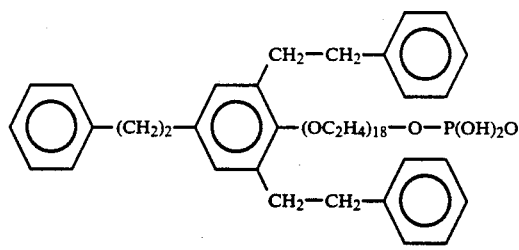 omega-(tris-2,4,6-ethylphenyl)-phenyl-polyethyloxy-phosphate | |
| 300 | Filler: calcium carbonate | Average particle diameter: 8 μm; BET surface: 1.5 m$^2$/g |
| | Thickening reagent, internal release agent, polymerization initiator same as Table 1 | |
| 2 | Coloring agent: carbon black | Average particle diameter: 17 mm; BET surface: 150 m$^2$/g |
| 60 | Glass fibers | Diameter: 10 μm; length: 6 mm |

EXAMPLE 2

(WHITE, DYED POLYESTER BMC COMPOUND)

With a formulation which otherwise is the same as in Example 1, the following modifications apply:

TABLE 3

| Filler | dolomite (Ca-Mg-carbonate); |
| --- | --- |
| Average diameter | 7.5 μm; |
| BET surface | 0.46 m²/g |
| Coloring agent | 5 parts by weight rutile (TiO₂); |
| Average diameter | 0.3 μm; |
| Density | 4.0 g/cm²; |
| TiO₂ content | 92.5% |

The changes in dimension of the molded articles manufactured according to the Examples were measured on plates with the dimensions 120×120×4 (mm³) according to DIN 53 451 with the application of a pressing tool according to DIN 53 470. A negative (minus) sign means "contraction' and a positive (plus) sign means "expansion".

TABLE 4

| Formulation According to | Change in Dimensions (%) |
| --- | --- |
| Comparative example | −0.03 |
| Example 1 | +0.11 |
| Example 2 | +0.10 |

It is apparent from Table 4 that, even when a very high proportion of fillers is employed with LS- additive there is significant shrinkage while With the invention a degree of expansion is achieved which in the past required LP- additives that impaired uniform dyeability.

A vacuum manifold was manufactured from the formulation according to Table 2 (Example 1), by melting core technology. Its surface had a uniform, dull-black shine and the appearance of a quality plastic. The black color hides the intrinsic colorations of the constituents of the compound. Dullness caused by oil mist or residues from combustion from an automotive engine can be removed by simply wiping with a cloth to restore the shiny surface.

BMC molded components including a white dye according to Example 2 (Table 3) find application in household products and recreational products. Thus, for example, one can manufacture housings for small kitchen appliances or toys, which have an aesthetic clean outward appearance. Here, in particular, it is desirable to have a uniform surface color quality with a high shine.

A beaker was manufactured with the BMC compound of Example 2 in a molding press. The pressing temperature was 150° C., and the molding pressure was 250 bar. The resultant beaker had a diameter of 74 mm (top) and 58 mm (bottom) with a height of 93.5 mm and a wall thickness of 1.5 mm. Its surface was pure white and shiny; inhomogeneities, associated with the prior art BMC compounds as a result of the filler or resin striae, were not observed. The hygienic appearance and uniform properties of such pure white molded components makes them particularly suitable for sanitary products, covers for washing machines and the like.

EXAMPLE 3

When the commercially available, surfactant used in Examples 1 and 2 was replaced by a surfactant having the following formula:

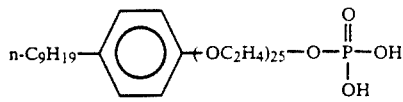

(omega - (4-nonyl)-phenyl-polyethoxy-phosphate) in an equivalent percentage by weight in compounds otherwise having the same formulation as those of Examples 1 and 2, the same positive results were obtained as with omega-(tris-2,4,6-ethylphenyl)-phenyl-polyethoxy-phosphate. Also, all of the measured values, as well as the excellent dyeability, were similar to those of the above described molded components manufactured according to the invention.

What is claimed is:

1. A uniformly dyeable BMC compound, comprising a curable base resin including a thermoplastic contraction-compensating additive and a surfactant, having the formula:

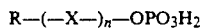

wherein X is ethylene or propylene oxide; n is a whole number between 0 and about 40; and R is an aliphatic or aromatic group including about 5 to about 40 carbon atoms.

2. The uniformly dyeable BMC compound of claim 1, wherein the curable resin is selected from the group consisting of unsaturated polyester and vinyl ester resins, in a monomer solvent.

3. The uniformly dyeable BMC compound of claim 1, wherein the curable resin is a thermoset resin selected from the group consisting of maleic acid, orthophthalic acid, isophthalic acid, terephthalic acid, and bisphenol-A esters.

4. The uniformly dyeable BMC compound of claim 3, wherein the curable resin is dissolved in a styrene monomer.

5. The uniformly dyeable BMC compound of claim 2, wherein the thermoplastic contraction-compensating additive is selected from the group consisting of polystyrene and polyethylene dissolved in a monomer.

6. The uniformly dyeable BMC compound of claim 5, wherein the thermoplastic contraction-compensating additive is dissolved in a styrene monomer.

7. The uniformly dyeable BMC compound of claim 5, further including a dye.

8. The uniformly dyeable BMC compound of claims 1 or 5, wherein the surfactant is provided in an amount effective to reduce the viscosity of the base resin to a minimum and further including a filler.

9. The uniformly dyeable BMC compound of claim 7, further comprising at least one constituent selected from the group consisting of reinforcing fibers, thickening agent, mold release agent, polymerization initiator, polymerization accelerator and polymerization inhibitor.

10. The uniformly dyeable BMC compound of claim 8, further comprising at least one constituent selected from the group consisting of reinforcing fibers, thickening agent, mold release agent, polymerization initiator, polymerization accelerator and polymerization inhibitor.

11. The uniformly dyeable BMC compound of claim 9, wherein the reinforcing fibers are glass fibers having a diameter of about 8 to 30 micrometers and a length of about 1 to 30 millimeters.

12. The uniformly dyeable BMC compound of claim 10, wherein the glass fibers have a diameter of about 8 to 30 micrometers and a length of about 1 to 30 millimeters.

13. The uniformly dyeable BMC compound of claim 9, wherein the mold release agent is selected from the group consisting of calcium stearate and zinc stearate; wherein the polymerization initiator is an alkyl salt of perbenzoic acid; wherein the polymerization inhibitor is p-benzoquinone; and wherein the polymerization accelerator is cobalt octanate.

14. The uniformly dyeable BMC compound of claim 8, wherein the filler is selected from the group consisting of calcium carbonate, aluminum trihydrate, dolomite, barium sulphate, and kaolin having a particle size distribution of about 0.25 to about 100 micrometers.

15. The uniformly dyeable BMC compound of claim 1, wherein the surfactant has the formula:
omega-(tris-2,4,6-ethylphenyl)phenyl - polyethyloxy-phosphate.

16. The uniformly dyeable BMC compound of claim 1, wherein the surfactant has the formula:
omega-(4-nonyl)-phenyl-polyethyloxy-phosphate.

17. A method for making a molded component with uniformly dyeable BMC compounds comprising the steps of:
(a) preparing a resin base including a resin selected from the group consisting of unsaturated polyester and vinyl ester, dissolved in styrene monomer and a contraction compensating thermoplastic selected from the group consisting of polystyrene and polyethylene, dissolved in styrene monomer;
(b) adding a surfactant having the formula:

R—(—X—)$_n$—OPO$_3$H$_2$ wherein X is selected from the group consisting of ethylene oxide and propylene oxide, n is an whole number between 0 and 40, and R is an aliphatic or aromatic group including about 5 to about 40 carbon atoms;
(c) adding a polymerization initiator, polymerization accelerator, polymerization inhibitor and mold release agent;
(d) adding a color pigment;
(e) adding a mineral filter and thickening agent;
(f) introducing the uniformly dyeable BMC compound from steps (a) to (e) into a mold to form a component; and
(g) removing the component from the mold.

18. The method of claim 17 wherein the BMC compound is the compound of claim 20.

19. A uniformly dyeable BMC compound comprising:
about 100 pbw curable resin component which includes about 50 to about 100 pbw of a resin selected from the group consisting of unsaturated polyesters and vinyl esters, dissolved or dispersed in styrene monomer, and 0 to about 50 pbw thermoplastic contraction-compensating additive, dissolved in styrene monomer;
the compound further comprising:
0 to about 3 pbw thickening agent;
about 1 to about 6 pbw mold release agent;
about 1 to about 4 pbw polymerization initiator;
0 to about 4 pbw polymerization accelerator;
about 0.5 to about 5 pbw pigment;
about 50 to about 250 pbw glass fibers having a diameter of about 8 to about 30 micrometers and length of about 1 to about 30 millimeters;
0 to about 0.5 pbw polymerization inhibitor;
about 250 to about 350 pbw of a mineral filler have a particle size distribution between about 0.5 and about 100 micrometers; and
about 0.3 to about 5.0 pbw of a surfactant having the formula:

R—(—X—)$_n$—OPO$_3$H$_2$ wherein X is selected from the group consisting of ethylene oxide and propylene oxide, n is an whole number between 0 and 40, and R is an aliphatic or aromatic group including about 5 to about 40 carbon atoms in an amount effective to reduce the viscosity of the compound to about minimum viscosity.

20. The uniformly dyeable BMC compound of claim 19, wherein the surfactant is selected from the group consisting of omega-(tris-2,4,6-ethylphenyl)phenyl - polyethyloxy-phosphate or omega-(4-nonyl)-phenyl-polyethyloxy-phosphate.

21. The uniformly dyeable BMC compound of claim 19, wherein the contraction-compensating additive is selected from the group consisting of polystyrene and polyethylene, dissolved in styrene monomer.

UNITED STATES PATENT AND TRADEMARK OFFICE
CERTIFICATE OF CORRECTION

PATENT NO.  : 5,104,983
DATED       : April 14, 1992
INVENTOR(S) : Claude STOCK, et al.

It is certified that error appears in the above-indentified patent and that said Letters Patent is hereby corrected as shown below:

Column 4, line 11, after "uniformly" insert --dispersed--.

Column 4, line 68, after "250" insert --parts--.

Column 5, line 15, after "barium" insert --sulphate--.

Column 5, line 22, change "(I) R" to --(I):  R--.

Column 5, line 23, change "Whole" to --whole--.

Column 8, lines 12 and 13, change "-polyethoxy" to ---polyethyloxy--.

Column 10, line 14, change "-compenstating" to ---compensating--.

UNITED STATES PATENT AND TRADEMARK OFFICE
CERTIFICATE OF CORRECTION

PATENT NO. : 5,104,983
DATED : April 14, 1992
INVENTOR(S) : Claude STOCK, et al.

It is certified that error appears in the above-indentified patent and that said Letters Patent is hereby corrected as shown below:

Column 5, line 34, after "overcompensate" insert --the--.

Signed and Sealed this

Fourteenth Day of December, 1993

*Attest:*

BRUCE LEHMAN

*Attesting Officer*  *Commissioner of Patents and Trademarks*